US012717009B2

(12) United States Patent
Sato et al.

(10) Patent No.: US 12,717,009 B2
(45) Date of Patent: Aug. 25, 2026

(54) MEASUREMENT SYSTEM, MEASUREMENT METHOD, AND NON TRANSITORY COMPUTER READABLE STORAGE MEDIUM

(71) Applicants: DENSO CORPORATION, Kariya City (JP); TOYOTA JIDOSHA KABUSHIKI KAISHA, Toyota (JP); MIRISE Technologies Corporation, Nisshin (JP)

(72) Inventors: Masashige Sato, Nisshin City (JP); Taku Suzuki, Nisshin City (JP); Yoshiki Matsumoto, Kariya City (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 1056 days.

(21) Appl. No.: 17/873,737

(22) Filed: Jul. 26, 2022

(65) Prior Publication Data

US 2023/0033127 A1 Feb. 2, 2023

(30) Foreign Application Priority Data

Jul. 28, 2021 (JP) ................................ 2021-123356

(51) Int. Cl.
*G01S 7/00* (2006.01)
*G01S 7/4913* (2020.01)
(Continued)

(52) U.S. Cl.
CPC ............ *G01S 7/4913* (2013.01); *G01S 17/34* (2020.01); *G01S 17/58* (2013.01)

(58) Field of Classification Search
USPC ........................................................ 356/5.01
See application file for complete search history.

(56) References Cited

U.S. PATENT DOCUMENTS 7,932,855 B2 * 4/2011 Uebo ...................... G01S 13/32 342/129
11,802,965 B2 * 10/2023 Crouch ................ G01S 7/4911
(Continued)

FOREIGN PATENT DOCUMENTS

EP 3593167 B1 * 8/2021 ............. G01S 17/34
JP 2019-039671 A 3/2019
JP 2021-004800 A 1/2021

OTHER PUBLICATIONS

Zhang et al., "Frequency-modulated continuous-wave lidar using a phase-diversity coherent optical receiver for simultaneous ranging and velocimetry," IEEE Photonics Technology Letters, vol. 31, No. 22, Nov. 15, 18, 22, 2019.

*Primary Examiner* — James R Hulka
(74) *Attorney, Agent, or Firm* — Posz Law Group, PLC

(57) ABSTRACT

A measurement system determining a correspondence between detection signals regarding distance and relative speed of multiple targets includes: a first result acquisition unit performing FFT processing on a signal generated based on both of an in-phase component and an orthogonal component of the reception light, and acquiring, as a first result, a peak frequency regarding the distance and a peak frequency regarding the relative speed; a second result acquisition unit acquiring, as a second result, a peak frequency detected by performing FFT processing on at least one of the in-phase component signal and the orthogonal component signal; and a combination determination unit determining, as a third result, a combination of correspondence between the distance and the relative speed based on both of the first result and the second result.

12 Claims, 6 Drawing Sheets

(51) Int. Cl.
*G01S 17/34* (2020.01)
*G01S 17/58* (2006.01)

(56) References Cited

U.S. PATENT DOCUMENTS

| | | | | |
|---|---|---|---|---|
| 12,259,473 | B2 * | 3/2025 | Tsuchida | G01S 7/493 |
| 2009/0251360 | A1 | 10/2009 | Uebo | |
| 2019/0310372 | A1 | 10/2019 | Crouch et al. | |
| 2020/0284883 | A1 * | 9/2020 | Ferreira | G01S 7/4815 |
| 2021/0405194 | A1 | 12/2021 | Tsuchida | |
| 2024/0053452 | A1 * | 2/2024 | Herzog | G01S 7/4917 |

* cited by examiner

B1
B2
I SIGNAL
Q SIGNAL
S101i
SIGNAL CORRECTION
S101q
SIGNAL CORRECTION
S102i
$(I^2+Q^2)^{1/2}$
S102q
atan(I/Q)
S103i
FFT
S103q
FFT
S104i
DETECT PEAK FREQ fR OF DISTANCE
S104q
DETECT PEAK FREQ fd OF RELATIVE SPEED
S105i
FFT
S105q
FFT
S106
ADD SPECTRA
S107
DETECT PEAK FREQ f
S208
COMPUTE PEAK COMBINATIONS OF $f\Delta = f \pm fR$
S209
VERIFY $fd - f\Delta$ MATCH DETERMINE SIGN OF SPEED
S210
OUTPUT COMBINATIONS (fRn, fdn)

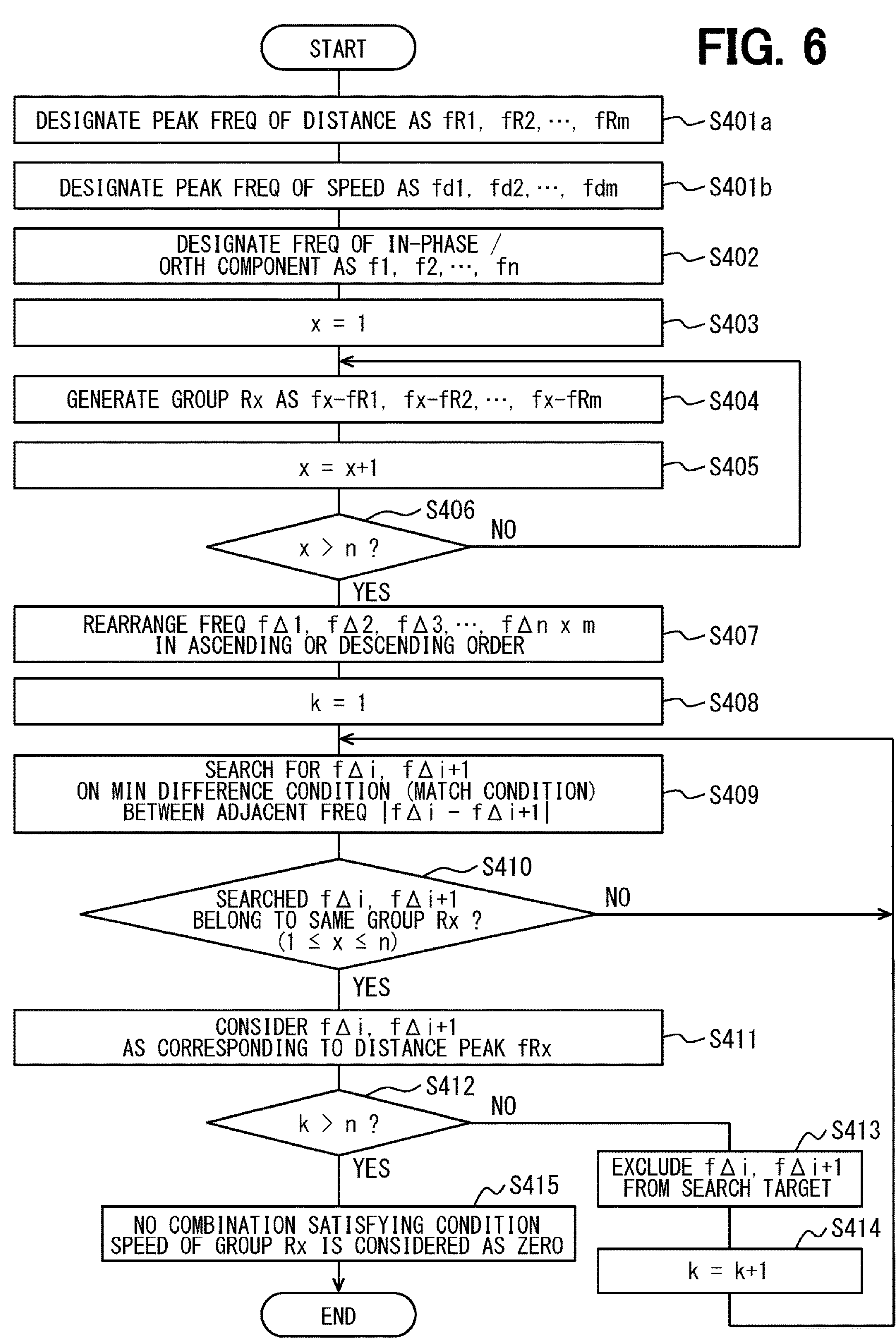
FIG. 6
START
DESIGNATE PEAK FREQ OF DISTANCE AS fR1, fR2, ⋯, fRm
S401a
DESIGNATE PEAK FREQ OF SPEED AS fd1, fd2, ⋯, fdm
S401b
DESIGNATE FREQ OF IN-PHASE / ORTH COMPONENT AS f1, f2, ⋯, fn
S402
x = 1
S403
GENERATE GROUP Rx AS fx-fR1, fx-fR2, ⋯, fx-fRm
S404
x = x+1
S405
S406
x > n ?
NO
YES
REARRANGE FREQ fΔ1, fΔ2, fΔ3, ⋯, fΔn x m IN ASCENDING OR DESCENDING ORDER
S407
k = 1
S408
SEARCH FOR fΔi, fΔi+1 ON MIN DIFFERENCE CONDITION (MATCH CONDITION) BETWEEN ADJACENT FREQ |fΔi − fΔi+1|
S409
S410
SEARCHED fΔi, fΔi+1 BELONG TO SAME GROUP Rx ? (1 ≤ x ≤ n)
NO
YES
CONSIDER fΔi, fΔi+1 AS CORRESPONDING TO DISTANCE PEAK fRx
S411
S412
k > n ?
NO
YES
S413
EXCLUDE fΔi, fΔi+1 FROM SEARCH TARGET
S414
k = k+1
S415
NO COMBINATION SATISFYING CONDITION SPEED OF GROUP Rx IS CONSIDERED AS ZERO
END

MEASUREMENT SYSTEM, MEASUREMENT METHOD, AND NON TRANSITORY COMPUTER READABLE STORAGE MEDIUM

CROSS REFERENCE TO RELATED APPLICATION

The present application is based on and claims the benefit of priority of Japanese Patent Application No. 2021-123356, filed on Jul. 28, 2021, the disclosure of which is incorporated herein by reference.

TECHNICAL FIELD

The present disclosure relates to a measurement system, a measurement method, and a non transitory computer readable storage medium.

BACKGROUND

Development of LiDAR: Light Detection and Ranging is in progress for the purpose of application to surrounding environment recognition sensors for automobiles, autonomous robots, and shape measurement at construction and civil engineering sites.

SUMMARY

According to an aspect of the present disclosure, a measurement system is configured to output, toward the targets, a transmission light including a subcarrier, in which frequency is changed by modulating a carrier wave of a single frequency light source and to performs a coherent detection on a reception light reflected by and received from the target to measure a distance to and a relative speed of targets.

BRIEF DESCRIPTION OF THE DRAWINGS

Objects, features, and advantages of the present disclosure will become more apparent from the following detailed description made with reference to the accompanying drawings, in which:

FIG. 6 is a flowchart illustrating a processing flow of a fourth embodiment.

DETAILED DESCRIPTION

Figure 1:
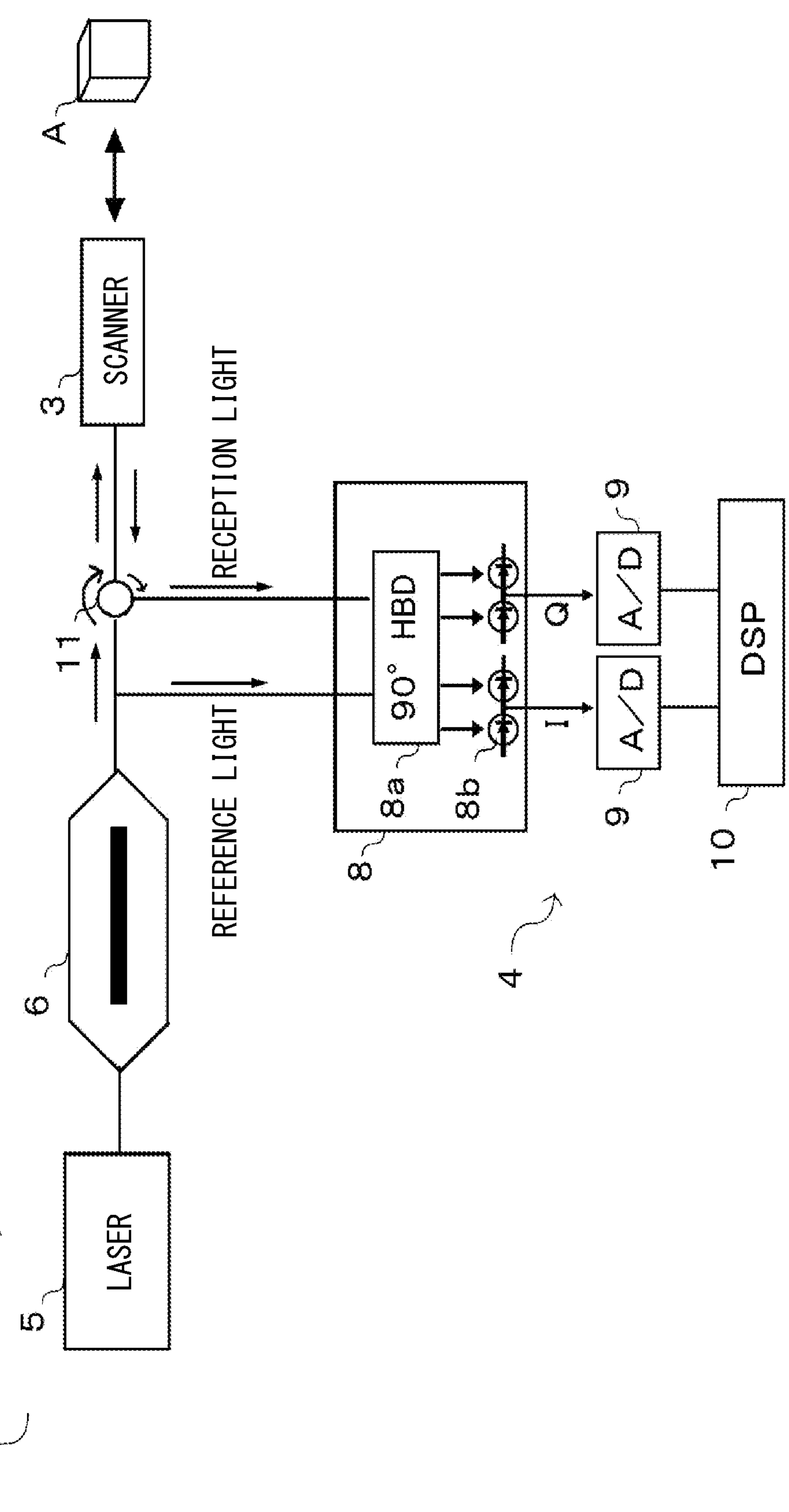
FIG. 1 is a functional block diagram showing a configuration according to a first embodiment.

Hereinafter, examples of the present disclosure will be described.

According to the present disclosure, a frequency-modulated continuous wave (FMCW) type LiDAR is an example that enables to reduce the peak power, widen the dynamic range, and have excellent ranging resolution. As a result, FMCW-based LiDAR has been widely applied to 3D imaging, meteorological observation, autonomous navigation, remote sensing, and autonomous driving. For example, phase diversity coherent detection enables to simultaneously measure the intensity and phase of an optical signal, thus enhancing the performance of LiDAR.

However, in some assumable applications, such as autonomous navigation, due to the movement of the target, the Doppler frequency shift effect is added to the distance-related chirp frequency, i.e., such an effect is superimposed thereon. In FMCW-LiDAR, triangular waveform modulation may be adopted, and attempts are made to measure a distance and a speed separately. However, in the assumable FMCW-LiDAR, for the separation of the distance and the speed, it is considered to be necessary to use both of (i) the frequency obtained by the up-chirp and (ii) the frequency obtained by the down-chirp of the triangular wave modulation. Therefore, information on the distance and on the speed may not be simultaneously obtained at certain timing.

According to the present disclosure, an FMCW LiDAR that is a phase diversity coherent optical receiver enables simultaneous measurement of the distance and the speed. This LiDAR adopts the FMCW method using a subcarrier, and generates a beat signal to compute the distance and speed by chirping the frequency of the subcarrier and by partially performing heterodyne detection as reference light. In addition, distance and speed are separated by using coherent detection for heterodyne detection.

When receiving light reflected by each of a plurality of targets, a detection signal is generated for each of the distances to the plurality of targets. Since each detection signal corresponds to a corresponding single target, it is possible to measure the distance to each of the targets.

However, since a plurality of detection signals are generated also based on the speed, it may not be possible to determine the correspondence between one of the plurality of targets, which corresponds to a detection signal generated based on the distance, and one of the detection signals generated based on the speed. A method can be considered to associate the distance-based detection signal with the speed-based detection signal based on the intensity of each of the detection signals. However, when the reflection intensity is substantially the same among detection signals, such a method may not determine which of the targets corresponds to which of the detection signals of the speed.

Also, in principle, when the relative speed with the target is zero, the speed peak is not generated. Therefore, when the speed peak is a certain value, though the relative speed of some of the multiple targets can be grasped, the situation is not determinable in terms of (i) which target has the zero relative speed or (ii) the multiple targets all have the same speed.

According to an example of the present disclosure, a measurement system is configured to output, toward the targets, a transmission light including a subcarrier, in which frequency is changed by modulating a carrier wave of a single frequency light source and to performs a coherent detection on a reception light reflected by and received from the target to measure a distance to and a relative speed of targets.

The measurement system comprises a first result acquisition unit configured to perform FFT processing on a signal, which is generated based on both of an in-phase component and an orthogonal component of the reception light, and acquire, as a first result, a peak frequency regarding the distance and a peak frequency regarding the relative speed.

The measurement system further comprises a second result acquisition unit configured to acquire, as a second result, a peak frequency detected by performing FFT processing on at least one of the in-phase component signal and the orthogonal component signal.

The measurement system further comprises a combination determination unit configured to determine, as a third result, a combination of correspondence between the distance and the relative speed based on both of the first result and the second result.

According to the example, the combination determination unit enables to determine the combination of the correspondence between the distance and the relative speed as the third result based on both of the first result and the second result, thereby enabling determination of the correspondence between the distance detection signal and the speed detection signal for multiple targets.

Hereinafter, a plurality of embodiments regarding a measurement system will be described with reference to the drawings. In the following embodiments, elements corresponding to those which have been described in the preceding embodiment(s) are designated by the same reference numerals, and redundant description may be omitted.

First Embodiment

The first embodiment is described with reference to FIGS. 1 to 3. A measurement system 1 is, for example, mounted on an automobile and is used for the purpose of detecting other vehicles, pedestrians, and the like around a subject vehicle as a target A, to avoid a collision, to ensure safe, and secure driving. As shown in FIG. 1, the measurement system 1 includes a modulated light output unit 2, a scanner 3, and a measurement unit 4.

The modulated light output unit 2 includes a laser 5 and an amplitude modulator 6. The measurement unit 4 includes a coherent detector 8, an A/D 9, and a DSP (Digital Signal Processor) 10. The scanner 3 is composed of a transmission scanner and a reception scanner. The scanner 3 including transmission and reception scanners is composed of, for example, a reflection mirror or prism having a mechanism, an optical phased array (OPA), or the like for changing an angle.

The laser 5 is composed of a DFB (Distributed Feedback) laser, a DBR (Distributed Bragg Reflector) laser, an external resonance type laser, or the like. The laser 5 outputs a carrier wave as a single frequency light source.

The amplitude modulator 6 generates a subcarrier whose frequency is changed by using, for example, a Mach-Zehnder modulator. When an oscillation light is input from the laser 5, the amplitude modulator 6 modulates the input oscillation light based on an AC signal and a DC bias input from the outside. The amplitude modulator 6 modulates the carrier wave of the laser beam output by the laser 5 to generate and output the transmission light having a subcarrier.

The amplitude modulator 6 linearly changes the frequency of the subcarrier. The frequency of the subcarrier changes linearly, nevertheless, it is noted that, it may be changed from a predetermined frequency either to an up chirp or a down chirp. The transmission light is split into two, with one light entering the coherent detector 8 as a reference light, and the other light entering the scanner 3 through an optical circulator 11.

When the transmission scanner 3 receives light through the optical circulator 11, the input light is output to a space. When the output light hits the target A and is reflected, the reflected light is incident on the reception scanner 3 as an incident light. The reception scanner 3 outputs the reception light to the coherent detector 8 through the optical circulator 11.

The coherent detector 8 is configured by using a 90° optical hybrid 8*a* and a balanced photodiode 8*b*. When the reception light is input from the scanner 3 through the optical circulator 11, the coherent detector 8 detects a difference regarding the amplitude and phase between the input reception light and the reference light, and generates and outputs an in-phase component I and an orthogonal component Q of a beat signal.

In such case, a frequency difference is generated between the reflected light and the reference light in the subcarrier frequency component based on a round-trip time difference of a modulated light corresponding to the distance from the measurement system 1 to the target A. Further, between the reflected light and the reference light, a frequency change occurs as a Doppler shift in the carrier frequency component, corresponding to a relative speed v between the measurement system 1 and the target A. Differences in these frequency component changes appear in the beat signal.

The coherent detector 8 outputs the in-phase component I and the orthogonal component Q of the beat signal to the DSP 10 through the A/D 9. When the DSP 10 inputs a digital signal of the beat signal, the DSP 10 acquires a distance R and the relative speed v by performing various processes.

For example, the DSP 10 acquires a square root of a sum of squares of the in-phase component I and the orthogonal component Q detected by the balanced photodiode 8*b* of the coherent detector 8 as an amplitude component. Then, the DSP 10 acquires a peak frequency fR of a peak by performing FFT processing on the amplitude component. This corresponds to a first result of the present embodiment. Further, the DSP 10 acquires a divided value by dividing the in-phase component I by the orthogonal component Q, acquires an arctangent of the divided value as a phase component, and performs FFT processing on the phase component. The DSP 10 acquires a peak frequency fd by performing digital FFT processing. This also is the first result of the present embodiment. See a first result acquisition unit B1 shown in FIG. 2. That is, the first result acquisition unit B1 outputs, as the first results, the peak frequencies acquired by performing FFT processing on the signals generated based on both of the in-phase component I and the orthogonal component Q of the reception light.

Thereafter, the DSP 10 computes the distance R and the relative speed v from these peak frequencies. The distance R can be computed as a value that depends on the peak frequency fR. The relative speed v can be computed as a value that depends on the peak frequency fd. When there is one target A, the peak frequency fR and the peak frequency fd are acquired corresponding to the one target A. Therefore, the distance R and the relative speed v with respect to that one target A can be computed.

Hereinafter, a case where a plurality of targets A are measured is described. Here, the number of targets is designated as m. As described above, when the reflected light is incident from a plurality of targets A, the distance R to each of the plurality of targets A can be measured by detecting the corresponding peak frequency. However, since a plurality of peak frequencies regarding speed are also detected, it is not possible to determine the correspondence between one of the plurality of targets A, which corresponds to one of the detected peaks based on the distance corresponds, and one of the detected peaks based on the speed.

Figure 2:
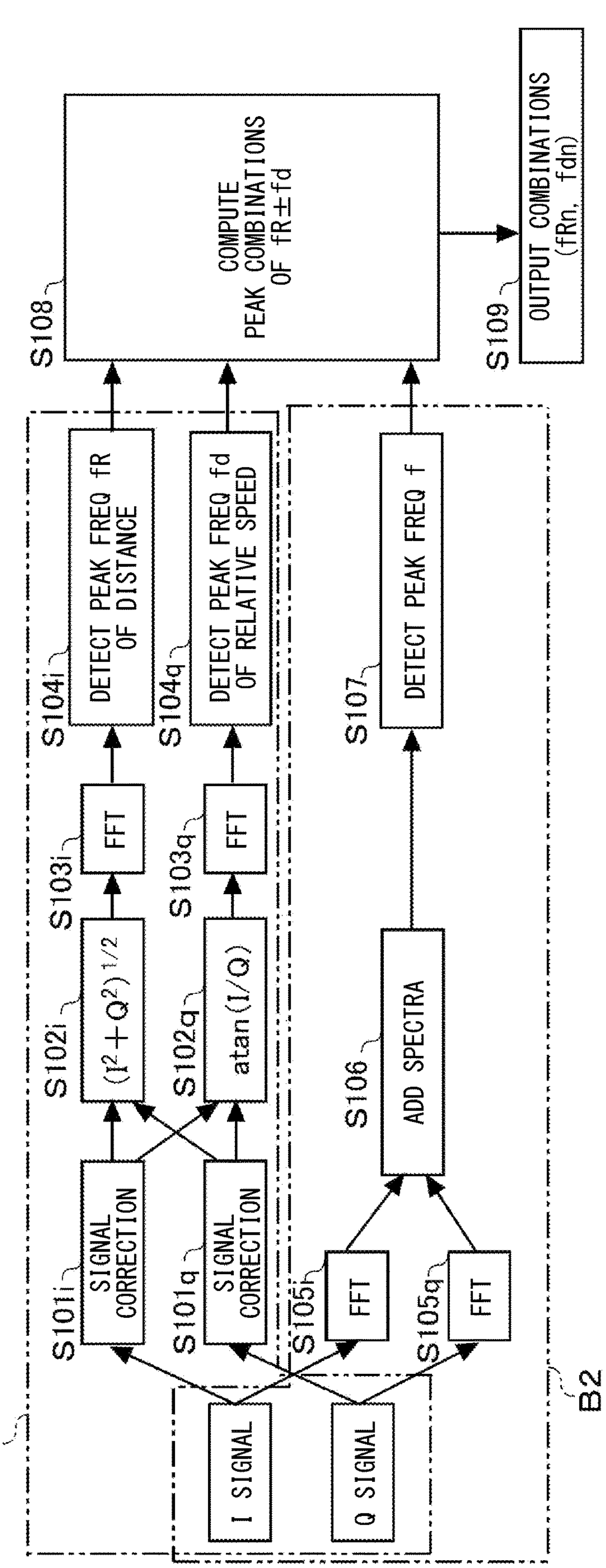
FIG. 2 is a flowchart illustrating a processing flow.

Therefore, in the present embodiment, the DSP 10 performs the processing along the flow shown in FIG. 2, and computes the distance R and the relative speed v regarding the m pieces of the targets A, respectively. The details are described below. First, when the in-phase component I and the orthogonal component Q are input, the DSP 10 corrects a distortion generated in the in-phase component I and the orthogonal component Q in S101*i* and S101*q*.

Next, the DSP 10 acquires, in S102*i*, the square root of the sum of squares of the in-phase component I and the orthogonal component Q as an amplitude component, and acquires, in S102*q*, a phase component by dividing the in-phase component I by the orthogonal component Q, as an arctangent. Next, the DSP 10 performs digital FFT processing individually on the processing results of S102*i* and S102*q* in S103*i* and S103*q*.

Next, the DSP 10 detects, in S103*i, m* pieces of the peak frequencies fR regarding the distance according to the values acquired in S102*i*, and detects, in S103*q, m* pieces of the peak frequencies fd regarding the speed according to the values acquired in S102*q*. Up to this point, the processing content is the same as that of the first result acquisition unit B1 described above.

On the other hand, the DSP 10 performs FFT processing on spectra of the in-phase component I and the orthogonal component Q in S105*i* and S105*q*, and adds the spectra in S106. In such manner, the in-phase component I and the orthogonal component Q are averaged to remove noise, and the peak frequency f is detected in S107. This detected peak corresponds to the second result according to the present embodiment. See a second result acquisition unit B2 in FIG. 2. This peak frequency f corresponds to the frequency of an original signal of the beat signal.

The DSP 10 computes, in S108, peak combinations of the peak frequencies fR±fd. This process is an operation as a combination determination unit according to the present application. Here, when m pieces of the targets A are measured, combinations of (m fR)±(m fd) are computed. In the following, the detected peak frequencies of (m pieces of fR) are designated as fR→fRx1, . . . , fRxm for convenience, and the detected peak frequencies of (m pieces of fd) are designated as fd→fdx1, . . . , fdxm. Then, the DSP 10 derives, regarding each of the plurality of targets A, a correspondence between the peak frequency with respect to the distance R and the peak frequency with respect to the relative speed v based on the peak frequency f of the original signal of the beat signal acquired in S107.

Figure 3:
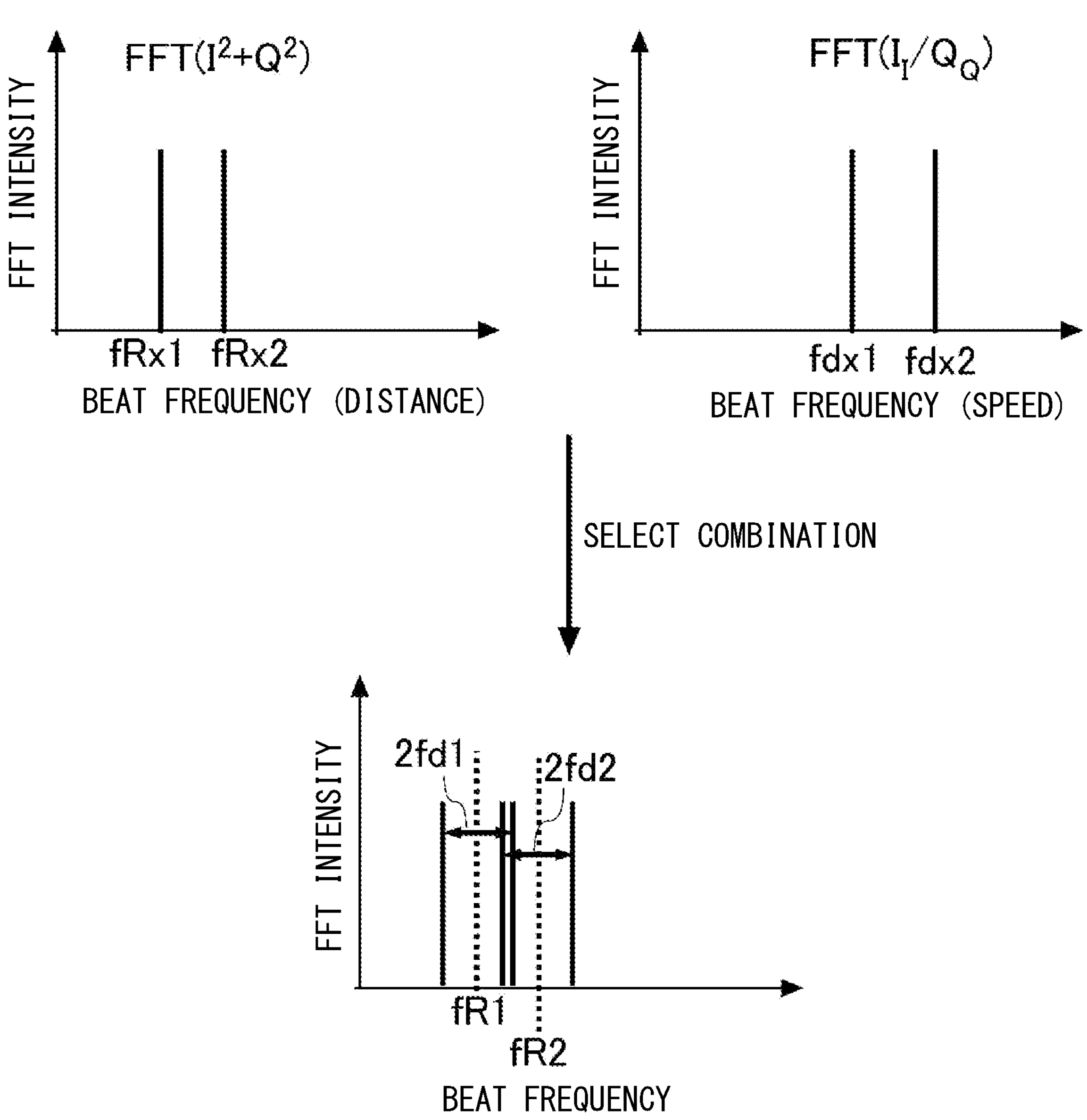
FIG. 3 is a processing image of combination selection.

FIG. 3 shows an example in which the targets A are measured by the number m=2. When the detected peak frequencies fRx1 and fRx2 are regarding the distance and the detected peak frequencies fdx1 and fdx2 are regarding the speed, all combinations of frequencies acquired in S108 are fRx1±fdx1, fRx1±fdx2, fRx2±fdx1 and fRx2±fdx2, which are treated as combination candidates.

The detected peaks for each of the targets A appear as fR1±fd1 and fR2±fd2 of the original signal (II, IQ) in principle. See a lower part of FIG. 3. Therefore, by selecting a combination of the peaks that satisfy such a principle regarding the original signal (II, IQ) from among the above-mentioned combination candidates of the detected peak frequencies, a correspondence between the peak frequency regarding the distance R and the peak frequency regarding the relative speed v is derivable.

For example, whether any combination of detected peaks exists near the detected peak frequency fRx1 or fRx2 regarding the distance R, i.e., whether separation condition satisfying pair of peaks is found about the detected peak frequency fRx1 or fRx2, which are equally separated therefrom by an amount fdx1 or fdx2 of the detected peak frequency regarding the relative speed exist, is determined by using the peak frequency f of the original signal, and, a combination satisfying such a condition is selected as the combination of the detected peaks. By performing the above determination, it is possible to deterministically derive a correspondence as to which of the detected peak frequencies fRx1 and fRx2 regarding the distance R corresponds to which of the detected peak frequencies fdx1 and fdx2 regarding the relative speed v.

Here, an example in which two targets A are used as the detection targets has been described. However, even when there are three or more targets A to be detected, these relationships are similarly determinable.

In such manner, it is possible to determine which one of the targets A, which corresponds to one of the detected peaks based on the distance, corresponds to one of the detected peaks based on the speed. Thus, it is possible to determine the correspondence between the detected peak of the distance R and the detected peak of the relative speed v for each of the plurality of targets A.

When a combination of the detected peak frequencies fRx1 and fRx2 regarding the distance R and the detected peak frequencies fdx1 and fdx2 regarding the relative speed v is selected, the relative speed v may be computed based on a frequency difference from the peak frequencies fRx1 and fRx2 regarding the detected distance to the selected peak frequencies fdx1 and fdx2, respectively. In such manner, it is possible to determine at what relative speed v each of the plurality of targets A is moving.

Second Embodiment

Figure 4:
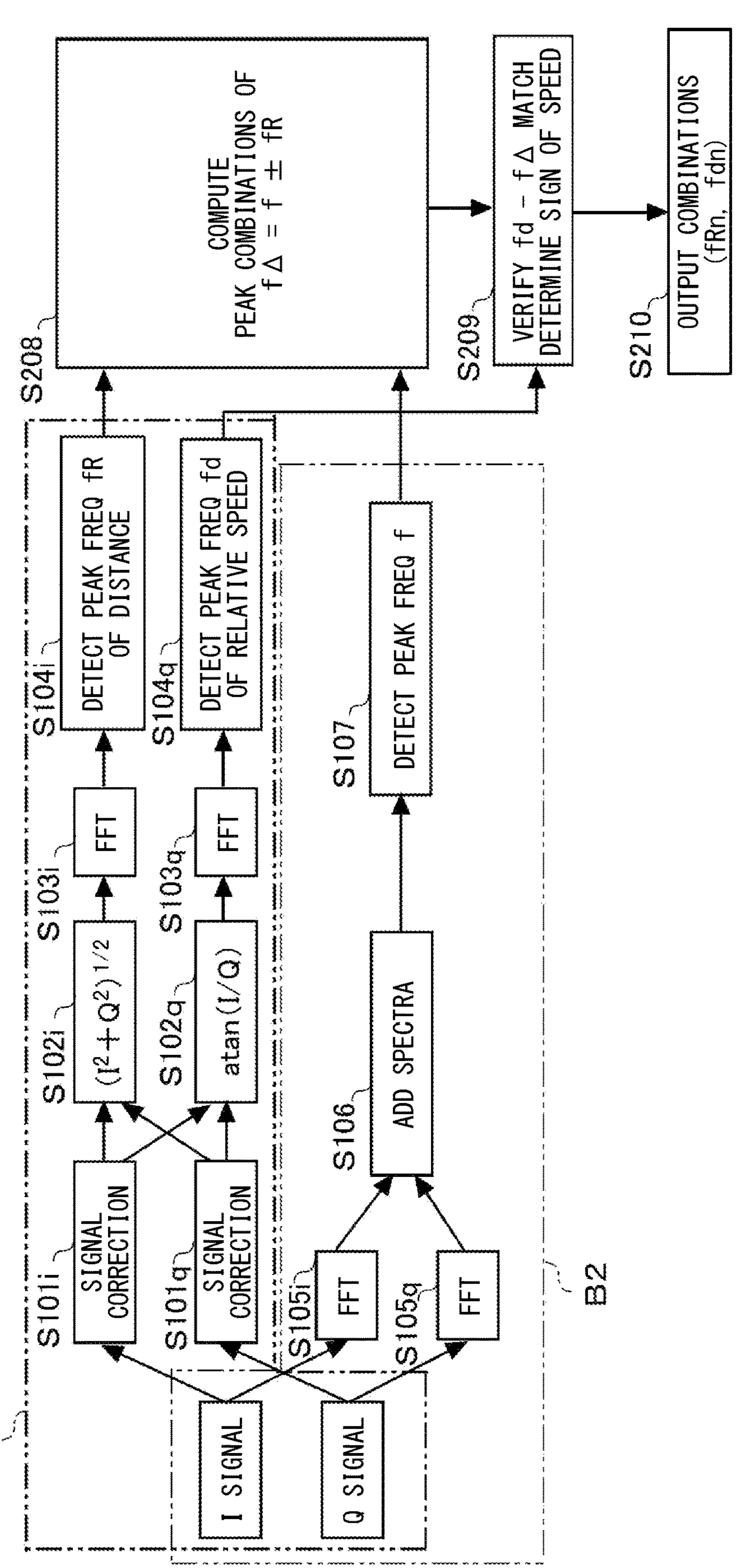
FIG. 4 is a flowchart illustrating a processing flow of a second embodiment.

The second embodiment is described with reference to FIG. 4. As shown in FIG. 4, after performing the processes of S101*i* to S104*i*, S105*i* and S105*q*, S106, and S107, the DSP 10 computes, in S208, a frequency difference to, between the peak frequency f acquired in S107 and the peak frequency fR regarding the distance. On the other hand, the DSP 10 performs the processes of S101*q* to S104*q* in parallel. After that, the process of S209 is performed.

The DSP 10 verifies, in S209, whether or not (i) m pieces of peak frequencies fd regarding the relative speed v acquired in S104*q* and (ii) the difference frequencies fΔ acquired only from S104*i* and S107 match. When the DSP 10 determines that they match, the DSP 10 is able to determine the correspondence between the peak frequency fd and the peak frequency fR. The processing of these S208 and S209 shows the processing as a combination determination unit.

Then, after computing the relative speed v of each target A based on the peak for which the correspondence is determined, a sign (i.e., + or −) of the relative speed v may be determined by comparing (i) the peak frequency fΔ detected in S208 and (ii) the peak frequency fd detected in S104*q*. In such manner, a travel direction of each target A is determinable.

The DSP 10 outputs the correspondence between the peak frequency fR and the peak frequency fd in S210 together with the direction of the relative speed v. By determining whether or not they match, the DSP 10 can determine the sign of the relative speed v in consideration of the phase component of the relative speed v, and can determine whether the target A is moving away or approaching.

Third Embodiment

Figure 5:
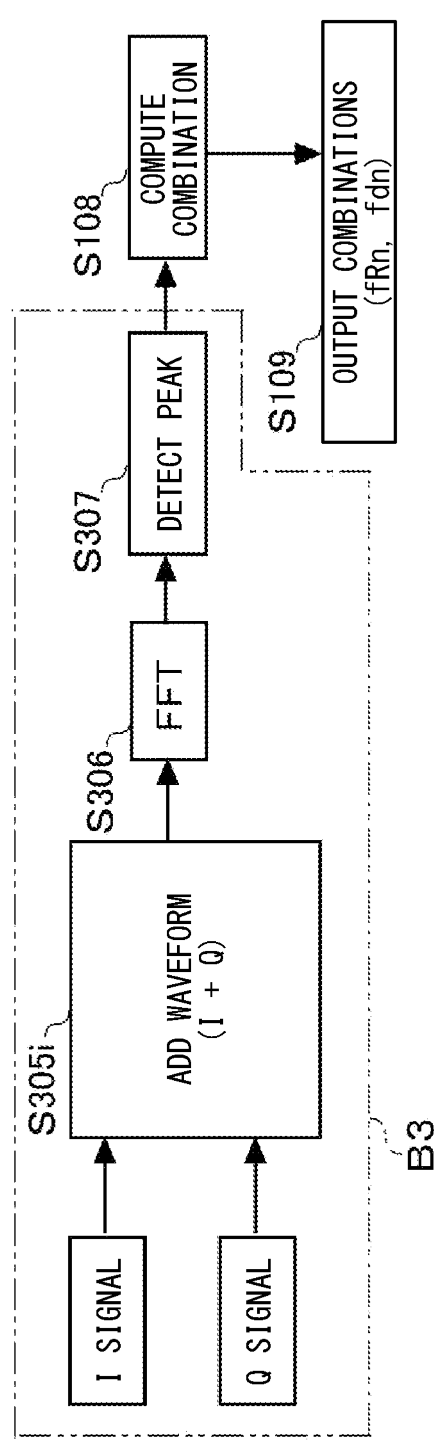
FIG. 5 is a flowchart illustrating a processing flow of a second result acquisition unit in a third embodiment.

The third embodiment is described with reference to FIG. 5. In the above-described embodiments, averaging of the original signals by adding spectra after FFT processing of each of the in-phase component I and the orthogonal component Q is shown, in an example of the second result acquisition unit B2 of FIG. 2 or FIG. 4. Instead, as shown in FIG. 5, a second result acquisition unit B3 may also be feasible, in which signals of the in-phase component I and the orthogonal component Q are added in S305, then undergo digital FFT processing in S306, and peaks are detected in S307. In such manner, the same effect as that of the above-described embodiments is achievable.

Fourth Embodiment

The fourth embodiment is described with reference to FIG. 6. A method for detecting m pieces of targets A is described. First, in S401*a* shown in FIG. 6, the peak frequencies regarding the distance R are designated as fR1, fR2, fRm. In S401*b*, the peak frequencies regarding the relative speed v are designated as fv1, fv2, . . . , fvm. Then, the frequencies detected by the in-phase component I or the orthogonal component Q in S402 are designated as f1, f2, fn.

These frequencies fR1, fR2, fRm, fv1, fv2, . . . , fvm, and f1, f2, . . . , fn are detectable by performing the same processing as the first result acquisition unit B1, the second result acquisition unit B2, B3 described in the first to third embodiments.

Next, the DSP 10 generates a frequency difference group Rx composed of differences between (i) the frequencies f1, f2, . . . , fn of the original signals detected by the in-phase component I and the orthogonal component Q and (ii) the peak frequencies fR1, fR2, . . . , fRm regarding the distance. In S403 to S405 of FIG. 6, the frequency difference group Rx is generated by repeating n times with x as a variable. The generation result is as follows.

Group R1 f1-fR1, f1-fR2, f1-fRm

Group R2 f2-fR1, f2-fR2, f2-fRm

. . .

Group Rn fn-fR1, fn-fR2, fn-fRm

Then, the DSP 10 rearranges the absolute values of all frequencies acquired by the above computation in S407 in ascending or descending order. At this time, the frequency differences of n×m acquired by sorting are defined as fΔ1,fΔ2, . . . , fΔn×m.

Then, the DSP 10 sets an initial value of a variable k in S408, and in S409, a search is performed for finding a combination in which a frequency difference fΔi and a frequency difference fΔi+1 match or are close to each other, that is, a combination having a small absolute value of difference between a frequency difference fΔ*i*— a frequency difference fΔi+1.

Then, in S410, it is determined whether all the searched frequency difference combinations (fΔi, fΔi+1) belong to the group Rx. If all of them belong to the group Rx, it is considered in S411 that the combination corresponds to the peak frequency fRx regarding the distance. Then, while excluding fΔi and fΔi+1 from the search target in S413 and changing the variable k in S414, the processes of S409 to S412 are repeated n times, so that the peak frequency combinations regarding the distance R and the relative speed v are acquired for all of the targets A. The processing content as the combination determination unit which concerns on the present application is shown.

When there exists a group Rx with no corresponding combinations as YES determination of S412, the relative speed v of the target A corresponding to the detected peak of such a distance R is considered as zero in S415, that is, the target A is determined as a stationary object. In such manner, the distance R and the relative speed v are graspable for all the detected targets A.

Other Embodiments

The present disclosure should not be limited to the embodiments described above, and various modifications may further be implemented without departing from the spirit of the present disclosure. For example, the following modifications and extensions may be made.

In the above-described embodiment, the in-phase component I and the orthogonal component Q are averaged after FFT processing and addition, and then the peak is detected. Further, in the above-described embodiment, the in-phase component I and the orthogonal component Q are averaged by adding waveforms as they are and then the peak is detected. However, the present disclosure is not limited thereto.

The signal of either of the in-phase component I or the orthogonal component Q may be processed by FFT processing, and the peak detection may be performed on such processing result to be used as the second result. That is, the peak acquired by FFT processing at least one of the signals of the in-phase component I and the orthogonal component Q may be used as the second result.

The method according to the DSP 10 described in the present disclosure may be realized by a dedicated computer provided by configuring a processor and memory programmed to perform one or more functions embodied by a computer program. Alternatively, the DSP 10 and its method described in the present disclosure may be realized by a dedicated computer provided by configuring a processor with one or more dedicated hardware logic circuits. Alternatively, the DSP 10 and its method described in the present disclosure may be realized by one or more dedicated computers, configured as a combination of a processor and memory programmed to perform one or more functions and a processor composed of one or more hardware logic circuits. Further, the computer program may also be stored on a computer-readable, non-transitory, tangible recording medium as instructions executed by a computer.

The present disclosure has been described in accordance with the embodiment described above. However, it is to be understood that the present disclosure is not limited to the embodiment and structure. The present disclosure includes various modifications and variations within the scope of equivalents. In addition, various modes/combinations, one or more elements added/subtracted thereto/therefrom, may also be considered as the present disclosure and understood as the technical thought thereof.

What is claimed is:

1. A measurement system configured to output, toward targets, a transmission light and measure a distance to and a relative speed of the targets, the measurement system comprising:

a modulator configured to generate the transmission light having a subcarrier in which a frequency is changed by modulating a carrier wave of a single frequency light source, a coherent detector configured to receive a reception light reflected by and received from the targets, the reception light including an in-phase component and an orthogonal component, receive a reference light from the transmission light including the subcarrier, and detect a difference regarding an amplitude and a phase between the reception light and the reference light, a first result acquisition unit configured to perform Fast Fourier Transform (FFT) processing on a signal generated based on both of the in-phase component and the orthogonal component of the reception light, and determine, as a first result, a peak frequency regarding the distance and a peak frequency regarding the relative speed;

a second result acquisition unit configured to determine, as a second result, a peak frequency detected by performing FFT processing on at least one of the in-phase component signal and the orthogonal component signal; and a combination determination unit configured to determine, as a third result, a correspondence between the peak frequency regarding the distance and the peak frequency regarding the relative speed of a same target of the targets based on both of the first result and the second result.

2. The measurement system of claim 1 further comprising:

the modulator configured to generate the subcarrier by continuously changing the frequency when modulating the carrier wave.

3. The measurement system of claim 2, wherein the modulator is configured to linearly change the frequency of the subcarrier.

4. The measurement system of claim 1, wherein the combination determination unit is configured to determine whether a combination, which satisfies a condition in which the peak frequency, which is determined as the second result, is separated from the peak frequency regarding the distance, which is determined as the first result, equally by the peak frequency regarding the speed and select the combination of detected peak frequencies, which satisfies the condition.

5. The measurement system of claim 4, wherein the combination determination unit is configured to compute the relative speed based on a difference between the peak frequency regarding the distance and the peak frequency, which is determined as the second result.

6. The measurement system of claim 1, wherein the combination determination unit is configured to compute a frequency difference between the peak frequency regarding the distance, which is determined as the first result, and the peak frequency, which is determined as the second result, determine whether the frequency difference and the peak frequency regarding the relative speed, which is determined as the first result, match, and determine a combination of correspondence of peak frequencies.

7. The measurement system of claim 6, wherein the relative speed is computed based on peak frequencies, of which the correspondence of the combination is determined by the combination determination unit, and a sign of the relative speed is determined with reference to the peak frequency regarding the relative speed, which is determined as the first result.

8. The measurement system of claim 1, wherein the second result is computed by performing FFT computation on the in-phase component and the orthogonal component and by adding a spectra thereof.

9. The measurement system of claim 1, wherein the first result acquisition unit is configured to determine, as the first result, a peak frequency (fR), which corresponds to the distance, by performing FFT processing on a square root of a sum of squares of the in-phase component (I) and the orthogonal component (Q), and a peak frequency (fd), which corresponds to the relative speed, by performing FFT processing on a phase component, which is an arctangent of a divided value obtained by dividing the in-phase component (I) by the orthogonal component (Q), the second result acquisition unit is configured to determine, as the second result, a peak frequency (f), which is detected by performing FFT processing on spectra of the in-phase component (I) and the orthogonal component (Q) and adding the spectra, the first result acquisition unit is configured to determine, as the first result, a peak frequency (fR1), which corresponds to a distance to a first target (A), a peak frequency (fd1), which corresponds to a relative speed of the first target (A), a peak frequency (fR2), which corresponds to a distance to a second target (B), and a peak frequency (fd2), which corresponds to a relative speed of the second target (B), the combination determination unit is configured to determine, as the third result and based on the second result, a combination of the detected peak frequency (fR1), which corresponds to the distance and equally separated by an amount of the detected peak frequency (fd1), which corresponds to the relative speed, and a combination of the detected peak frequency (fR2), which corresponds to the distance and equally separated by an amount of the detected peak frequency (fd2), which corresponds to the relative speed.

10. A measurement method to measure a distance to and a relative speed of targets, the measurement method comprising:

outputting, toward the targets, a transmission light including a subcarrier in which a frequency is changed by modulating a carrier wave of a single frequency light source, performing a coherent detection on a reception light, which includes an in-phase component and an orthogonal component, and is reflected by and received from the targets, and detecting a difference regarding an amplitude and a phase between the reception light and a reference light from the transmission light including the subcarrier, performing Fast Fourier Transform (FFT) processing on a signal, which is generated based on both of the in-phase component and the orthogonal component of the reception light, and determining, as a first result, a peak by a first result acquisition unit;

determining, as a second result, a peak frequency detected by performing FFT processing on at least one of the in-phase component signal and the orthogonal component signal by a second result acquisition unit; and determining, as a third result, a correspondence between the distance and the relative speed of a same target of the targets based on both of the first result and the second result by a combination determination unit.

11. A non-transitory computer readable storage medium comprising instructions for execution by a computer for a measurement system configured to measure a distance to and a relative speed of targets, the instructions causing at least one processors to implement:

outputting, toward the targets, a transmission light including a subcarrier in which frequency is changed by modulating a carrier wave of a single frequency light source, performing a coherent detection on a reception light, which includes an in-phase component and an orthogonal component, and is reflected by and received from the targets, and detecting a difference regarding an amplitude and a phase between the reception light and a reference light from the transmission light including the subcarrier, performing Fast Fourier Transform (FFT) processing on a signal, which is generated based on both of the in-phase component and the orthogonal component of the reception light, and determining, as a first result, a peak;

determining, as a second result, a peak frequency detected by performing FFT processing on at least one of the in-phase component signal and the orthogonal component signal; and determining, as a third result, a correspondence between the distance and the relative speed of a same target of the targets based on both of the first result and the second result.

12. A measurement system comprising:

a laser configured to output a carrier wave as a single frequency light source;

a modulator configured to generate a transmission light having a subcarrier by modulating the carrier wave and output the transmission light toward a plurality of targets;

a coherent detector configured to receive a reception light reflected by and received from the plurality of targets, the reception light including an in-phase component and an orthogonal component, receive a reference light from the transmission light including the subcarrier, and detect a difference regarding an amplitude and a phase between the reception light and the reference light;

and a measurement device comprising:

a digital signal processor configured to:

perform Fast Fourier Transform (FFT) processing on a signal generated based on both of the in-phase component and the orthogonal component of the reception light, determine, as a first result, a plurality of peak frequencies regarding a distance and a plurality of peak frequencies regarding a relative speed, each peak frequency regarding the distance and each peak frequency regarding the relative speed corresponding to a respective target of the plurality of targets;

determine, as a second result, a peak frequency detected by performing FFT processing on at least one of spectra of the in-phase component signal and spectra of the orthogonal component signal; and determine, as a third result, for each target of the plurality of targets, a correspondence between one of the plurality of peak frequencies regarding the distance and one of the plurality of peak frequencies regarding the relative speed, based on both of the first result and the second result.

* * * * *